United States Patent
Manning

(10) Patent No.: US 8,183,709 B1
(45) Date of Patent: May 22, 2012

(54) ELECTRICITY GENERATION FROM FORCED AIR FLOW

(76) Inventor: Anthony Manning, Apple Valley, CA (US)

( * ) Notice: Subject to any disclaimer, the term of this patent is extended or adjusted under 35 U.S.C. 154(b) by 357 days.

(21) Appl. No.: 12/586,243

(22) Filed: Oct. 20, 2009

(51) Int. Cl.
*F03D 9/00* (2006.01)
*H02P 9/04* (2006.01)

(52) U.S. Cl. .......................................... 290/55; 290/54
(58) Field of Classification Search .................. 290/55, 290/54, 44; 62/409
See application file for complete search history.

(56) References Cited

U.S. PATENT DOCUMENTS

| | | | |
|---|---|---|---|
| 3,930,625 A | 1/1976 | Krivka | |
| 5,512,788 A | 4/1996 | Berenda | |
| 6,365,985 B1 * | 4/2002 | Cohen | 290/55 |
| 7,145,258 B2 | 12/2006 | Kang | |
| 7,208,846 B2 | 4/2007 | Liang | |
| 7,404,299 B2 | 7/2008 | Drysdale | |
| 7,834,477 B2 * | 11/2010 | Sheikhrezai | 290/55 |
| 2008/0092542 A1 | 4/2008 | Graham | |
| 2008/0229779 A1 | 9/2008 | Ho | |
| 2009/0146425 A1 * | 6/2009 | Widisky | 290/44 |
| 2010/0244455 A1 * | 9/2010 | Berginc | 290/55 |

\* cited by examiner

*Primary Examiner* — Hae Moon Hyeon

(74) *Attorney, Agent, or Firm* — Dennis W. Beech

(57) ABSTRACT

The present invention is used for generating electricity from forced air flow. An electricity generator may have a first panel attached at a peripheral edge to a second panel at a peripheral edge to form a frame. The first panel and the second panel each have an opening with a propeller rotatably attached to a generator that is positioned in each opening for rotation caused by a forced air flow.

8 Claims, 1 Drawing Sheet

ELECTRICITY GENERATION FROM FORCED AIR FLOW

BACKGROUND OF THE INVENTION

This invention relates to apparatus and methods for generating electricity from the energy in a forced air flow. The forced air flow may be from an apparatus such as an appliance, an air conditioning or heating apparatus or other forced air flow device. The new electrical generating apparatus positions two propellers or non-powered fans in a forced air flow for rotation of an electrical generator to produce electricity.

Various methods and apparatus may be known for use of propeller type devices coupled to a generator or alternator such that rotation of the propeller will generate electricity. Commonly known equipment may include large wind turbines, exhaust air flow from ventilation systems and cooling systems and the like. Simple systems for positioning a simple propeller-generator in the exhaust air flow of a small household air conditioning condensing unit may be known. This type of generator may be fixed in place in the exhaust air flow with braces or a shroud. It should be noted that use of a shroud on an air conditioner may restrict exhaust air flow of an air conditioning unit to reduce efficiency or to damage the air conditioning unit.

SUMMARY OF THE INVENTION

The present invention is directed to apparatus and methods for generating electricity from forced air flow. An electricity generator may have a first panel attached at a peripheral edge to a second panel at a peripheral edge to form a frame. The first panel and the second panel may each have an opening with a propeller rotatably attached to a generator that is positioned in each opening for rotation caused by a forced air flow.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
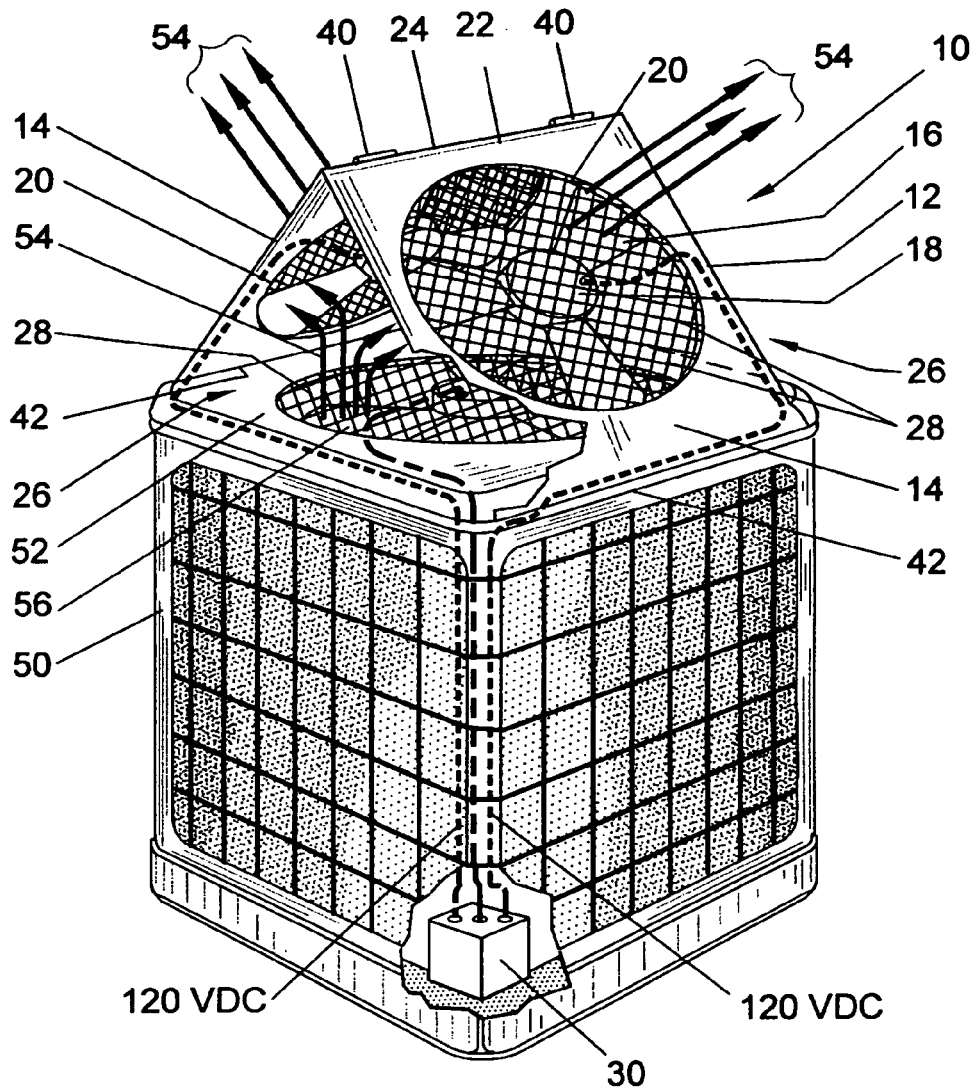
FIG. 1 illustrates a perspective view of an electricity generator position on an air conditioning unit according to an embodiment of the invention.
Figure 2:
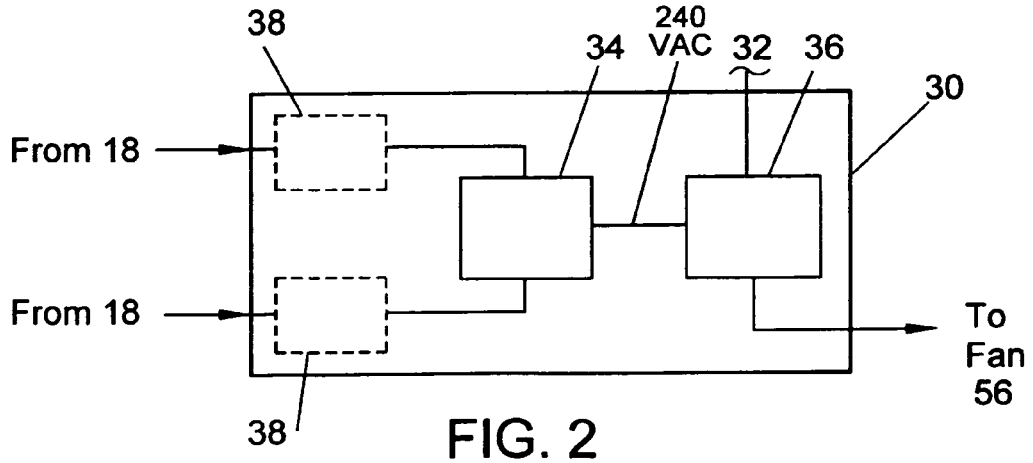
FIG. 2 illustrates a functional diagram of an electric power module according to an embodiment of the invention.

Referring to FIGS. 1 and 2, an electricity generating apparatus 10 may have a two panel frame 12 with a propeller 16 rotatably attached to a generator 18 or alternator positioned in an opening 20 in each of the panels 14. The panels 14 may be generally rectangular in form and may be attached one to the other at a peripheral edge 22. The attached panels 14 may be positioned at the exhaust end 52 of an air conditioning condensing unit 50 in a triangular arch configuration or form with a ridge 24 as best viewed in FIG. 1. This may cause a portion of forced exhaust air 54 exiting from the condensing unit 50 to pass through openings 20 in panels 14 to force rotation of propellers 16 to cause generators 18 to produce electricity. Some exhaust air 54 may also exit open ends 26 of the frame 12.

The condensing unit 50 for an air conditioning system may have cooling coils positioned in the side walls for flow of hot compressed refrigerant to be cooled by air flow forced by an electric powered fan 56 in the exhaust end 52. This air flow is the forced exhaust air 54 that may be used to produce electricity in the electric generator 10. The electricity generated may be conducted from the generators 18 to an electric power module 30 that may be mounted in the condensing unit 50. Both the fan 56 and the propellers 16 may be covered by a screen 28 or mesh material to inhibit contact with rotating blades.

The electric power module 30 may receive electric power from an external source 32 and from the generators 18. Generally an air conditioning unit for household use may use 220 volt AC power. The generators 18 may each produce 120 volt AC or DC power. If DC power may be produced each generator 18 may be connected to an inverter/modulator 34 to combine the two 120 volt DC sources and to convert them to 240 volts AC power to be communicated to a power distribution module 36. The external source 32 power may also be communicated to the power distribution module 36. The power distribution module 36 may be designed to supplement the external source 32 power with the generators 18 power depending on the amount of power produced by the electricity generator 10. If it may be desired to store portions of the electricity generated, the generators 18 may be connected to storage cells 38 that may then be connected to the inverter/modulator 34.

The panels 14 may be attached by hinges 40 at the peripheral edges 22 to allow flexibility in angular relationship when the electricity generator 10 may be attached at the exhaust end 52 of a forced air device such as an air conditioner condensation unit 50. A peripheral edge 42 opposite the peripheral edge 22 of each panel 14 may be attached adjacent the exhaust end 52 peripheral edge using fasteners, brackets or other attachment devices to form the arch structure of the electricity generator 10. The arch structure and use of two openings 20 may allow installation on existing air conditioning condensing units 50 as well as other forced air apparatus because the air flow of the apparatus is not unduly restricted such that the apparatus efficiency is severely reduced or the apparatus is damaged. Tests with a prototype unit installed on a condensing unit for an air conditioner has demonstrated that the two panel, two propeller and generator configuration is an efficient electricity generator 10. The electricity generated may be used to power electrical appliances, to supplement apparatus such as solar panels, and for other like applications. Various forced air apparatus or systems may have an electricity generator 10 incorporated to reduce types of energy usage.

While the invention has been particularly shown and described with respect to the illustrated embodiments thereof, it will be understood by those skilled in the art that the foregoing and other changes in form and details may be made therein without departing from the spirit and scope of the invention.

I claim:

1. An apparatus for generating electricity from forced air flow comprising:

an electricity generator with a first panel attached at a peripheral edge to a second panel at a peripheral edge to form a frame; and said first panel and said second panel each having an opening therein with a propeller rotatably attached to a generator that is disposed in each of said openings.

2. The apparatus as in claim 1 wherein said peripheral edge of said first panel and said peripheral edge of said second panel are attached by a hinge.

3. The apparatus as in claim 1 wherein each of said openings is covered by a screen disposed over each of said propellers.

4. The apparatus as in claim 1 wherein:
an electrical output of each of said generators is connected to an electric power module;
an inverter/modulator in said electric power module combines each of said electrical outputs and converts the electricity to a proper power output form.

5. The apparatus as in claim 1 wherein an electrical output of each of said generators is connected to a storage cell.

6. The apparatus as in claim 1 wherein:
said frame is attached at an opposed peripheral edge of said peripheral edge of each of said panels to an exhaust end of an exhaust air apparatus to form an arch triangular shape; and
said frame is disposed at said exhaust end to cause exhaust air flow through each of said openings.

7. The apparatus as in claim 6 wherein said exhaust air apparatus is an air conditioning system condensing unit.

8. The apparatus as in claim 4 wherein:
said electric power module receives electric power from an electric power source to power a fan to force air flow in an exhaust air apparatus; and
a power distribution module controls application of said proper power output form to said exhaust air apparatus to supplement application of said electric power source.

* * * * *